(12) United States Patent
Clapp et al.

(10) Patent No.: US 7,520,453 B2
(45) Date of Patent: Apr. 21, 2009

(54) SAFETY ACTUATOR FOR A FOOD PROCESSOR HAVING A VISUAL INDICATION

(75) Inventors: Larry D. Clapp, Chesterfield, VA (US); Derek Hassell, Lanexa, VA (US)

(73) Assignee: Hamilton Beach Brands, Inc., Glen Allen, VA (US)

( * ) Notice: Subject to any disclaimer, the term of this patent is extended or adjusted under 35 U.S.C. 154(b) by 134 days.

(21) Appl. No.: 11/682,123

(22) Filed: Mar. 5, 2007

(65) Prior Publication Data

US 2008/0217446 A1   Sep. 11, 2008

(51) Int. Cl.
*B02C 25/00* (2006.01)
*A47J 43/046* (2006.01)

(52) U.S. Cl. .................... 241/37.5; 241/282.1

(58) Field of Classification Search ............ 99/492, 99/337, 348; 366/601; 241/36, 37.5, 92, 241/282.1, 282.2
See application file for complete search history.

(56) References Cited

U.S. PATENT DOCUMENTS

| | | | |
|---|---|---|---|
| 4,113,188 A * | 9/1978 | Belinkoff .................. | 241/37.5 |
| D251,231 S | 3/1979 | Hashimoto | |
| D251,407 S | 3/1979 | Tsuji et al. | |
| 4,184,641 A | 1/1980 | Coggiola | |
| 4,213,569 A | 7/1980 | Amiot | |
| 4,371,118 A | 2/1983 | Sontheimer et al. | |
| 4,396,159 A | 8/1983 | Podell | |
| 4,406,603 A | 9/1983 | Williams | |
| 4,471,915 A | 9/1984 | Levin et al. | |
| 4,506,836 A | 3/1985 | Williams | |
| D290,677 S | 7/1987 | Stutzer et al. | |
| D292,260 S | 10/1987 | Barrault | |
| 4,706,896 A | 11/1987 | Moon-Kau | |
| 4,741,482 A | 5/1988 | Coggiola et al. | |
| D301,297 S | 5/1989 | Barrault | |
| D301,824 S | 6/1989 | Machuron | |
| D311,659 S | 10/1990 | Storsberg | |
| D339,502 S | 9/1993 | Kamiyama | |
| 5,323,973 A | 6/1994 | Ferrara, Jr. | |
| 5,524,530 A | 6/1996 | Nijzingh et al. | |
| 5,875,706 A | 3/1999 | Borger et al. | |
| 5,896,812 A | 4/1999 | Basora et al. | |
| 5,921,485 A | 7/1999 | Plavcan et al. | |
| 5,934,179 A | 8/1999 | Schmid et al. | |
| D426,423 S | 6/2000 | Lee | |

(Continued)

*Primary Examiner*—Mark Rosenbaum
(74) *Attorney, Agent, or Firm*—Panitch Schwarze Belisario & Nadel LLP

(57) ABSTRACT

A food processor for countertop foodstuff preparation comprises a receiving base that encloses an electric motor. The receiving base has a shaft driven by the motor. A pedestal extends generally upwardly from the outer periphery. The pedestal includes an actuator. The motor is operable when the actuator is in an activated position and inoperable when the actuator is in an unactivated position. A bowl is removably mountable on the receiving base. A lid is removably mountable over an open top of the bowl. The lid has an actuator tab that extends from the outer periphery and a positioning tab that extends from the outer periphery. The lid is rotatable for moving the actuator tab into engagement with the actuator to place the actuator in the activated position. The positioning tab extends over at least part of the pedestal to provide a visual indication when the actuator is in the activated position.

11 Claims, 5 Drawing Sheets

U.S. PATENT DOCUMENTS

| | | |
|---|---|---|
| D431,959 S | 10/2000 | Lallemand |
| D445,636 S | 7/2001 | Spagnolo |
| 6,568,843 B1 | 5/2003 | Lai |
| 6,715,706 B1 | 4/2004 | Planca et al. |
| 6,786,141 B2 | 9/2004 | Tompa et al. |
| 7,063,283 B2 | 6/2006 | Wanat et al. |
| 7,252,252 B2 * | 8/2007 | Mauch et al. .................. 241/92 |
| 2008/0135654 A1 * | 6/2008 | Pryor et al. ................. 241/37.5 |

* cited by examiner

SAFETY ACTUATOR FOR A FOOD PROCESSOR HAVING A VISUAL INDICATION

BACKGROUND OF THE INVENTION

This invention generally relates to food processors and, more particularly, to a food processor including a safety actuator having a positioning tab which provides a visual indication when the actuator is activated.

Household food processors commonly include a bowl and a rotatable shaft that projects upwardly into the bowl on which various selected food processing tools can be mounted to be driven by the shaft. The food processing tools perform various processing operations within the food processing bowl. For example, a household food processor may include a cutting tool, chopping tool, shredding disk, slicing disk, grating wheel and dicing tool. Each of these tools may be separate from each other and are generally disposed into the food processing bowl individually for performing a particular operation. A removable cover or lid is mounted onto the open top of the bowl during use and includes a feed tube having an opening that extends downwardly through the lid into the bowl. The food items to be processed are placed in the feed tube and then manually pushed down through the feed tube into the bowl by a removable food pusher which is adapted to slide down the feed tube. The lid and feed tube are used to keep food from leaving the bowl while the food processor is in use and to prevent fingers or other body parts from coming in contact with the shape food processing tools.

In order to ensure that the lid is safely in place, safety devices have been developed to prevent operation of the food processing tools while the bowl is uncovered. This ensures that the lid is safely covering the bowl and the food processing tools when the food processor is activated. Safety devices have been developed that require a tab extending from the lid to engage with an actuator in the base or motor housing when the lid is properly secured to the top of the bowl. Because the actuator is located within the base and is not visible by the user, it is often unclear how the lid is supposed to be positioned and whether the tab on the lid is in proper contact with the actuator for activating the motor.

It would therefore be desirable to provide a safety device on a food processor with a visual indicator such as a positioning tab that is more intuitive to a user as to how the lid is to be positioned on the bowl and clear as to when the tab is properly engaged with the safety actuator.

BRIEF SUMMARY OF THE INVENTION

Briefly stated, the present invention is directed to a food processor for countertop foodstuff preparation. The food processor comprises a receiving base that encloses an electric motor having a shaft driven by the motor. A pedestal extends generally upwardly from the outer periphery. The pedestal includes an actuator. The motor is operable when the actuator is in an activated position and inoperable when the actuator is in an unactivated position. A bowl having an open top is removably mountable on the receiving base in a fixed position in registry with the shaft. A lid is removably mountable over the open top of the bowl. The lid has an actuator tab that extends from the outer periphery and a positioning tab that extends from the outer periphery. The positioning tab is spaced axially above the actuator tab. The lid is rotatable for moving the actuator tab into engagement with the actuator to place the actuator in the activated position. The positioning tab extends over at least part of the pedestal to provide a visual indication when the actuator is in the activated position.

In another aspect, the invention is directed to a food processor for countertop foodstuff preparation. The food processor comprises a receiving base for enclosing an electric motor. The receiving base has a shaft driven by the motor and a pedestal that extends generally upwardly from the outer periphery. The pedestal includes an actuator. The motor is operable when the actuator is in an activated position and inoperable when the actuator is in an unactivated position. A bowl having an open top is removably mountable on the receiving base in a fixed position in registry with the shaft. A lid is removably mountable over the open top of the bowl. The lid has a positioning tab that extends from the outer periphery and an actuator tab that extends radially from the bottom of the positioning tab and is spaced axially below the positioning tab. The lid is rotatable for moving the actuator tab into engagement with the actuator to place the actuator in the activated position. The positioning tab is in registry with the pedestal to provide a visual indication when the activator is in the activated position.

BRIEF DESCRIPTION OF THE SEVERAL VIEWS OF THE DRAWINGS

The foregoing summary, as well as the following detailed description of a preferred embodiment of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

Figure 1:
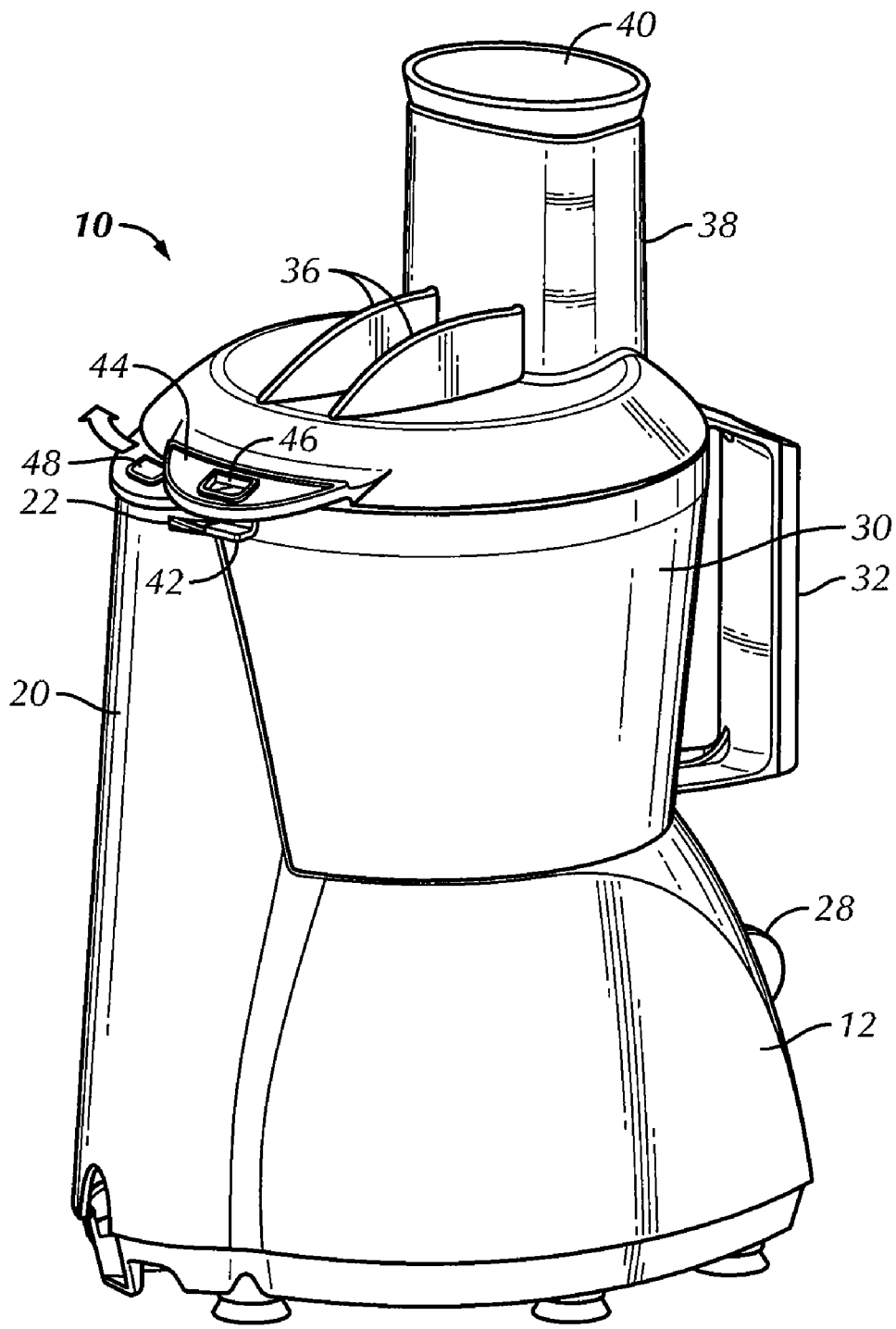
FIG. 1 is a rear, right side perspective view of a food processor in accordance with a first preferred embodiment of the present invention in an unactivated position.

Certain terminology is used in the following description for convenience only and is not limiting. The words "right," "left," "lower" and "upper" designate directions in the drawings to which reference is made. The words "inwardly" and "outwardly" refer to directions toward and away from, respectively, the geometric center of a safety actuator for a food processor having a positioning tab in accordance with the present invention, and designated parts thereof. The terminology includes the words noted above, derivatives thereof and words of similar import.

Unless specifically set forth herein, the terms "a", "an" and "the are not limited to one element but instead should be read as meaning "at least one".

Referring to the drawings, wherein like numerals indicate like elements throughout, there shown in FIGS. 1-4 a first preferred embodiment of a safety actuator for a food processor having a positioning tab (herein referred to as a food processor), generally designated 10. The food processor 10 is for being positioned on a support surface (not shown). The support surface is any type of flat surface which a user desires to position the food processor 10 for processing foodstuff. Typical support surfaces include kitchen countertops, kitchen tables, bars, etc.

Figure 3:
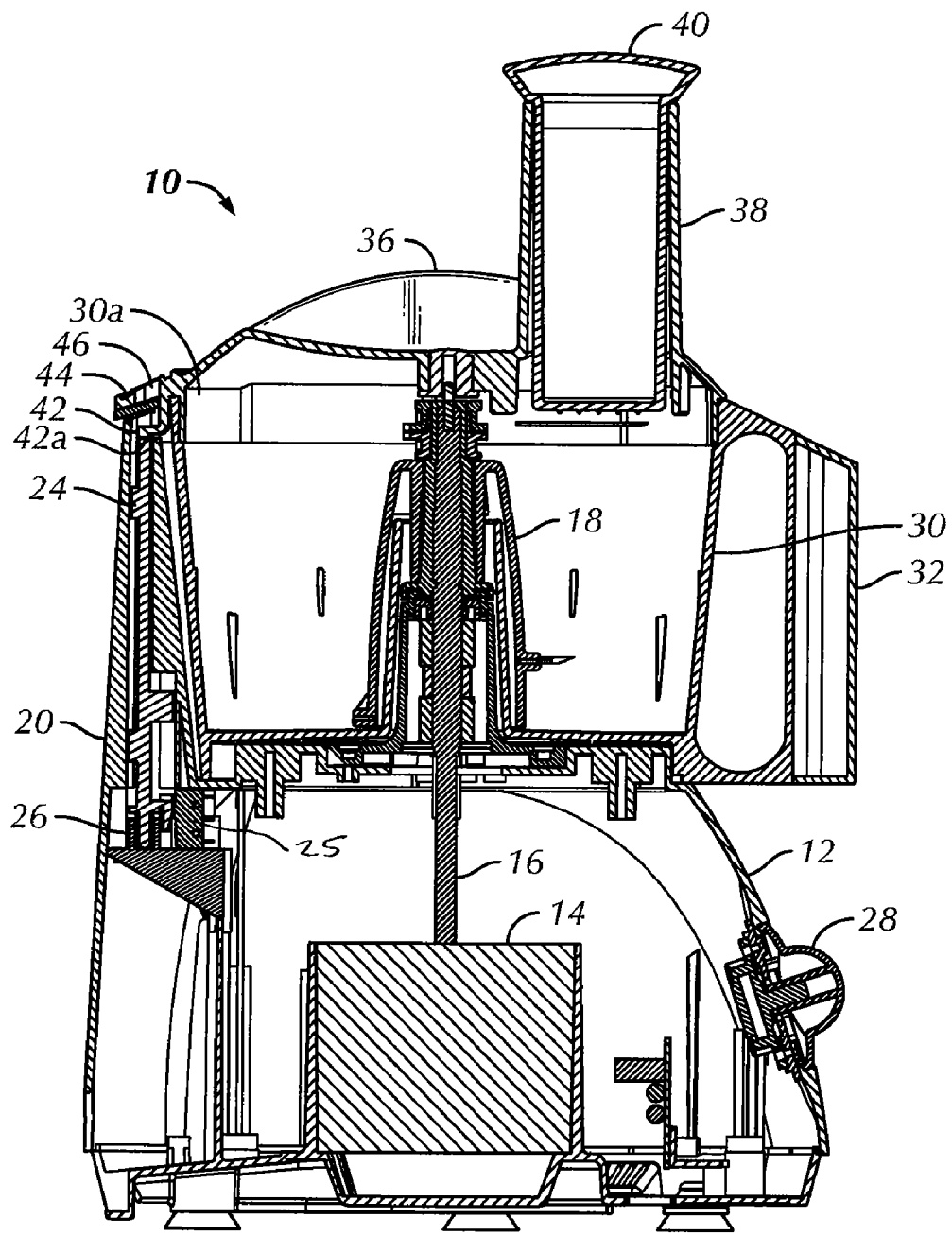
FIG. 3 is a side cross-sectional view of the food processor shown in FIG. 2 taken along line 3-3.

Referring to FIG. 3, the food processor 10 includes a receiving base 12 for enclosing an electric motor 14. The electric motor 14 is a standard electric motor used in small appliances well understood by those of ordinary skill in the art. Accordingly, further description of the motor 14 is admitted for purposes of convenience only and is not limiting.

The receiving base 12 includes a shaft 16 driven by the motor 14. The shaft 16 is shaped to fit a recess (not shown) of a blade assembly 18. The blade assembly 18 is preferably interchangeable and may have any configuration known in the art to blend and/or chop foodstuff within a food processor.

Referring to FIGS. 1-4, a pedestal 20 extends generally upwardly from the outer periphery of the receiving base 12. The pedestal 20 is preferably an extension of the receiving base 12 and tapers toward its distal end. The pedestal 20 preferably has a crescent shaped cross section but may have any shape and may house additional components of the receiving base 12 such as electronics or controls. The pedestal 20 includes a receiving slot 22 toward its proximal end. The receiving slot 22 is a generally horizontal opening that extends at least partially through the pedestal 20. Referring specifically to FIG. 3, the pedestal 20 includes an actuator 24. The actuator 24 is a bar shaped rod that extends along the length of the pedestal 20. The actuator 24 is spring biased upwardly by a spring 26 positioned within the receiving base 22 beneath or within the pedestal 20.

The motor 14 is operable by the use of a control 28. It is preferred that the control 28 is diametrically opposed to the pedestal 20. The control 28 is preferably a rotary knob switch but it is within the spirit and scope of the present invention that the control 28 include any type of operable switch known in the art such as a push button and may include more than one control 28. When the control 28 is set by a user to a predetermined setting, the motor 14 is activated to rotate the shaft 16 which in turn operates the blade assembly 18 to blend and/or chop foodstuff. However, before the motor 14 can be activated, the actuator 24 must be depressed or otherwise in an activated position in which a switch 25 is activated to an ON position to permit power to be supplied to the motor 14. The actuator 24 ensures that food processor 10 is safely assembled as described further below and prevents a user from unintentionally contacting the blade assembly 18. The motor 14 is inoperable when the actuator 24 is in an upward or otherwise unactivated position. Though a spring biased rod is preferred, it is within the spirit and scope of the present invention that any actuator or switch known in the art that is capable of activating and deactivating the motor 14 may be utilized.

Referring to FIGS. 1-4, a bowl 30 is removably mountable on the receiving base 12 in a fixed or otherwise unrotatable fixed position in registry with the shaft 16. The bowl 30 includes a handle 32. The bowl 30 is placed over the receiving base 12 with the handle 32 diametrically opposed to the pedestal 20. The recess on the bottom end of the bowl 30 is placed in registry with the shaft 16. The bowl 30 is then twisted axially with respect to the receiving base 12 until a tab (not shown) extending radially outwardly from the receiving base 12 engages with a slot or a pair of slots (not shown) in the bowl 30 to lock the bowl 30 onto the receiving base 12 such that the bowl 30 is prevented from rotating with respect to the receiving base 12. To remove the bowl 30 the bowl must first be rotated in the opposite direction it was secured into place before detaching the receiving slot from the shaft 16. It is within the spirit and scope of the present invention that the bowl 30 is kept in a locked position with respect to the receiving base 12 by any other method such as a keyed or snap fit. The bowl 30 is preferably generally cylindrically shaped and has a generally open top 30a.

A lid 34 is removably mountable over the open top 30a of the bowl 30. The lid 34 includes at least one upwardly extending arcuate shaped rib 36 and preferably a pair of spaced apart ribs 36. The ribs 36 are useful in gripping the lid and for turning the lid 34 into place as described below. The ribs 36 allow the lid 34 to be easily turned with one hand. The lid 34 also includes a food chute 38 extending upwardly through the lid 34. The food chute 38 allows the user to insert food stuff to be chopped and/or blended by the food processor 10. A food pusher 40 is preferably provided to slide within the food chute 38 and is used to urge foodstuff through the food chute 38 and into the bowl 30.

Figure 4:
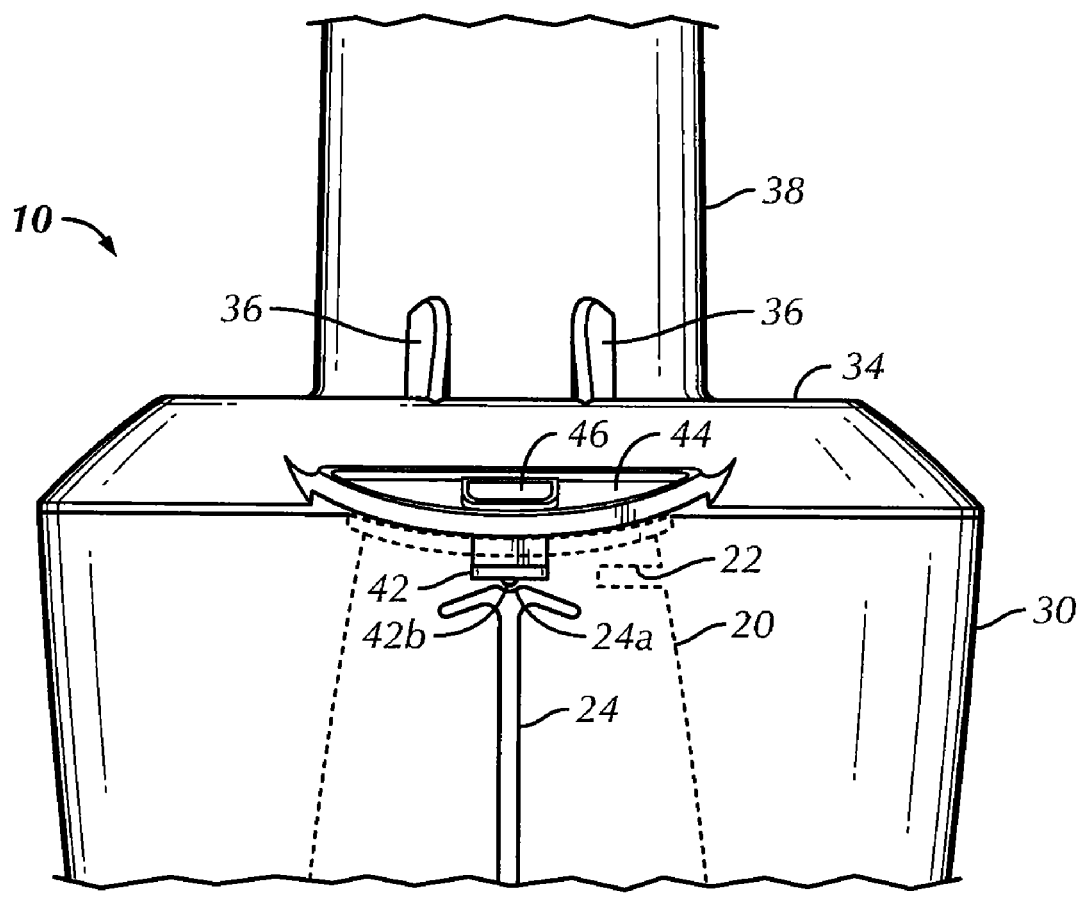
FIG. 4 is a partial, enlarged, elevational view of the food processor shown in FIG. 2 with the pedestal shown in phantom.

The lid 34 includes an actuator tab 42 extending from the outer periphery of the lid 34. The actuator tab 42 preferably extends axially downwardly along the outside of the open top 30a of the bowl 30 and then projects radially outwardly from the bowl 30 to form a generally L shaped tab. The horizontal section 42a of the actuator tab 42 is sized and shaped to fit at least partially within the receiving slot 22 in the pedestal 20. The actuator tab 42 may include a downwardly extending rib 42b for engagement with a groove 24a in the top of the actuator 24 (FIG. 4). The lid 34 also includes a positioning tab 44. The positioning tab 44 extends from the outer periphery of the bowl 30 and is spaced axially above the actuator tab 42. Though it is preferred that the positioning tab is aligned axially with the actuator tab 42, it is within the spirit and scope of the present invention that the positioning tab 44 be spaced from the actuator tab 42.

The positioning tab 44 includes a first locking member 46. The first locking member 46 is a window or gap that extends through the positioning tab 44 such that the user may see through the positioning tab 44 to what is beneath the positioning tab 44, either the actuator tab 42 in the unactivated position or the pedestal 20 in the activated position. The pedestal 22 preferably includes a second locking member 48. The second locking member 48 is preferably a raised knob that is sized and shaped to fit within the first locking member 46.

Figure 2:
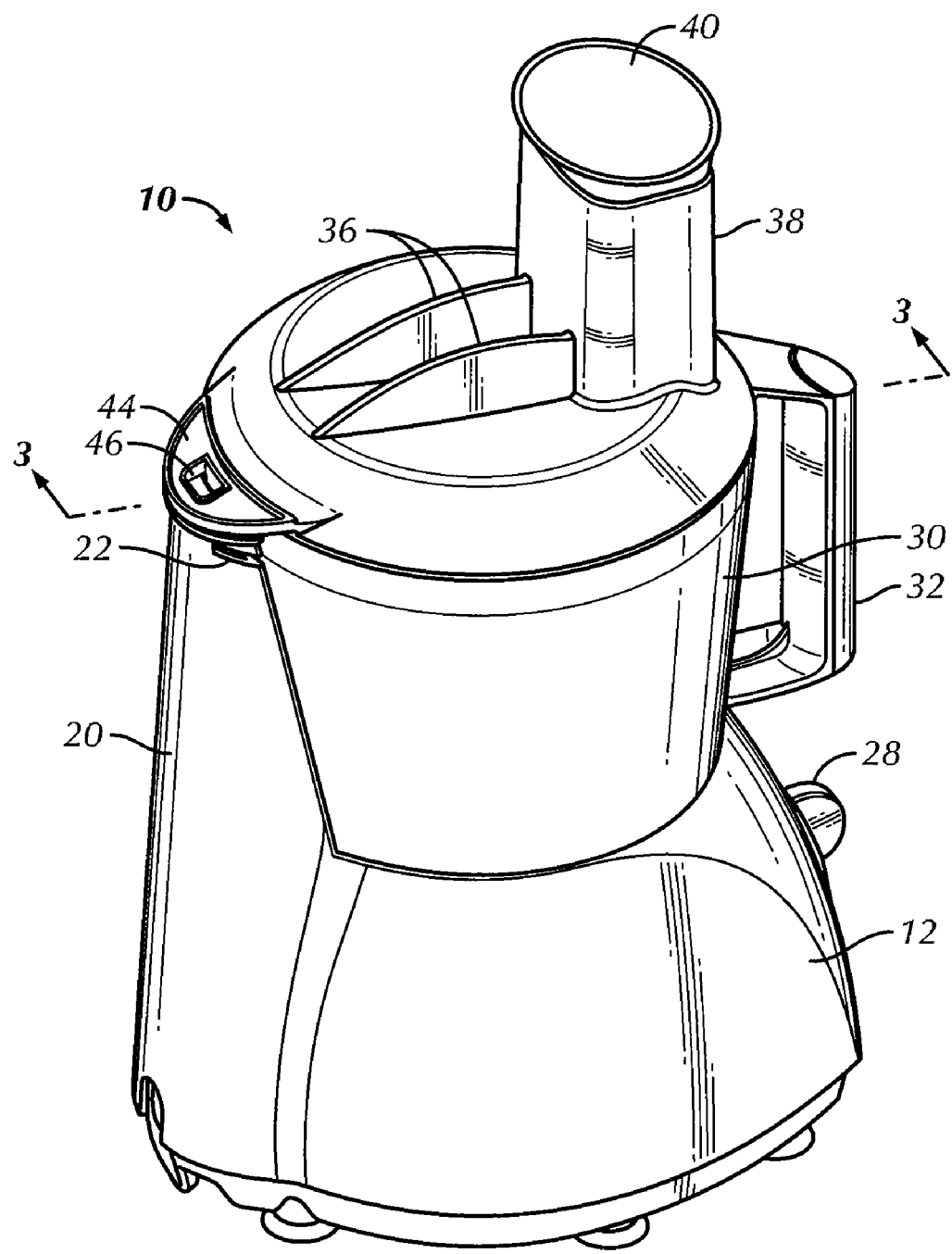
FIG. 2 is a rear, right side perspective view of the food processor shown in FIG. 1 in an activated position.

The lid 34 is rotatable for moving the actuator tab 42 into the receiving slot 22 and into engagement with the actuator 24. The actuator tab 42 urges the actuator 24 downwardly to place the actuator 24 in the activated position. In the activated position the positioning tab 44 extends over at least part of the pedestal 20 to provide a visual indication when the actuator 24 is in the activated position. The unactivated position is shown in FIG. 1 while an activated position is shown in FIGS. 2-3. In the activated position, the first and second locking members 46, 48 are resistantly engaged with each other such that the first locking member 46 is disposed around the second locking member 48 to create a snap or resistant fit. The proximal or top end of the pedestal 20 may be seen through the first locking member 46 and the top of the pedestal 20 is preferably a different color than the positioning tab 44 or an otherwise brightly colored surface that is easily seen through the first locking member 46 to indicate to the user that the actuator 24 is in the activated position and the control 28 may be used to operate the food processor 10. The receiving slot 22 preferably prevents the actuator tab 42 from continuous rotation through the pedestal 20 and also prevent removal of the lid 34 from the receiving base 12. It is within the spirit and scope of the present invention that the receiving slot 22 extends entirely through the pedestal 20 such that the actuator tab 42 and the lid 34 may be rotated entirely through the pedestal 20 enabling the activation of the actuator 24 from either side of the pedestal 20. It is preferred however that the receiving slot 22 extend only halfway through the pedestal 20 such that the lid 34 has a defined locked position in the activated position such that the user clearly knows when the actuator tab 42 is engaged with the actuator 24 and the food processor 10 is ready for operation.

Figure 5:
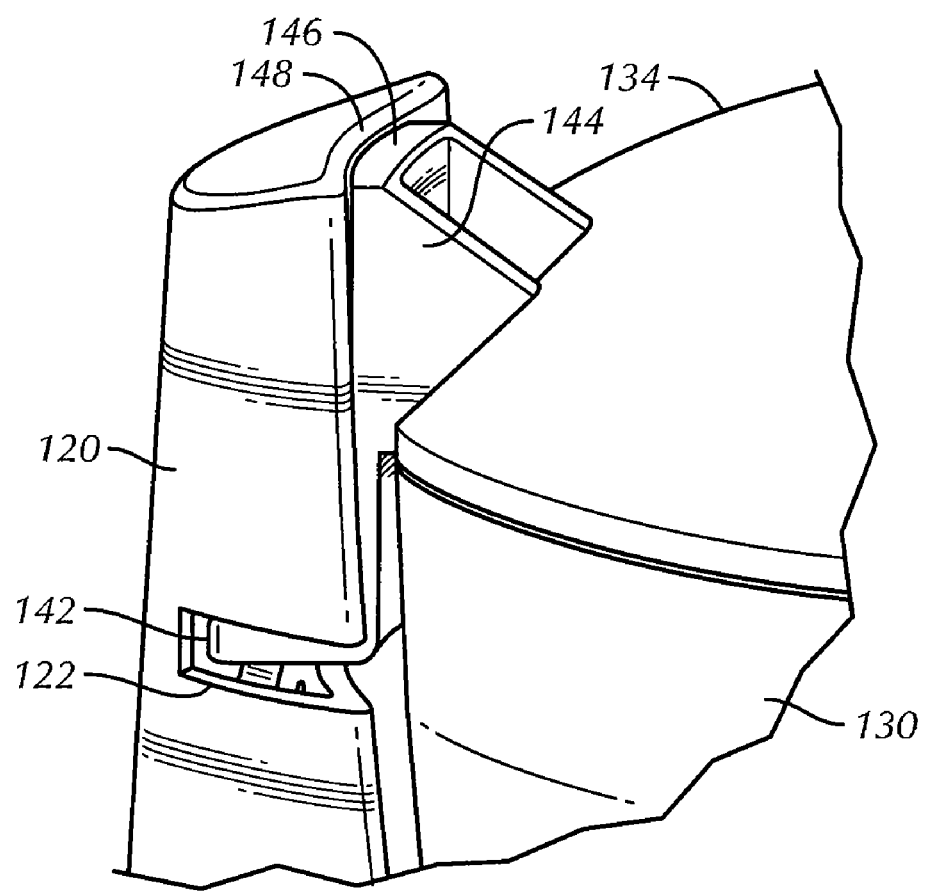
FIG. 5 is a rear, right side perspective view of a food processor in accordance with a second preferred embodiment in an activated position.

Referring to FIG. 5, a second preferred embodiment of the food processor, generally designated 110, is shown. The food processor 110 is similar to the first embodiment of the food processor 10 and a discussion of the similar features is omitted for convenience only. The various structural features are given the same numbers as the first embodiment but with the addition of 100. The second embodiment of the food processor 110 differs from the first embodiment of the food processor 10 in that a positioning tab 144 does not extend over the top of a pedestal 120. Similar to the first embodiment, the positioning tab 144 extends from the outer periphery of the lid 134 and an actuator tab 142 extends radially from the positioning tab 144. The actuator tab 142 preferably extends from the bottom of the positioning tab 144 such that the majority of the positioning tab 144 is visible from above the food processor 110. The lid 134 is rotatable for moving the actuator tab 144 into engagement with the actuator (not shown) to place the actuator in the activated position The positioning tab 144 preferably includes an anti-tilt abutment member 146 extending upwardly from the lid 134. That is, the abutment member 146 is preferably a radially projecting and axially extending ridge. The top of the pedestal 120 includes an arculate inner facing surface 148. The surface 148 is preferably in a complementary facing relationship with the abutment member 146 when the actuator is in an activated position. Similar to the positioning tab 44 of the first embodiment, the positioning tab 144 provides a visual indication of when the actuator is in the activated position. Additionally, the shapes of the abutment member 146 and surface 148 resists removing the lid 134 from the bowl 130 by lifting up on the handle 32 since the abutment member 146 will engage the surface 148. The engagement helps to keep the lid 134 in place and prevents the actuator tab 142 from unintentionally disengaging from the actuator.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A food processor for countertop foodstuff preparation, the food processor comprising:
    a receiving base enclosing an electric motor, the receiving base having a shaft driven by the motor and a pedestal extending generally upwardly from the outer periphery, the pedestal including an actuator, the motor being operable when the actuator is in an activated position and inoperable when the actuator is in an unactivated position;
    a bowl removably mountable on the receiving base in a fixed position in registry with the shaft, the bowl having an open top;
    a lid removably mountable over the open top of the bowl, the lid having an actuator tab extending from the outer periphery and a positioning tab extending from the outer periphery and spaced axially above the actuator tab, the lid being rotatable for moving the actuator tab into engagement with the actuator to place the actuator in the activated position, the positioning tab extending over at least part of the pedestal to provide a visual indication when the actuator is in the activated position.

2. The food processor of claim 1, wherein the lid includes at least one upwardly extending arcuate rib.

3. The food processor of claim 1, wherein the bowl includes a handle diametrically opposed to the pedestal.

4. The food processor of claim 1, wherein the positioning tab is at least partially aligned axially with the actuator tab.

5. The food processor of claim 1, wherein the positioning tab includes a first locking member and the pedestal includes a second locking member, the first and second locking members being resistantly engaged when the actuator is in the activated position.

6. The food processor of claim 1, wherein the base includes a control for operating the motor, the control being diametrically opposed to the pedestal.

7. A food processor for countertop foodstuff preparation, the food processor comprising:
    a receiving base enclosing an electric motor, the receiving base having a shaft driven by the motor and a pedestal extending generally upwardly from the outer periphery, the pedestal including an actuator, the motor being operable when the actuator is in an activated position and inoperable when the actuator is in an unactivated position;
    a bowl removably mountable on the receiving base in a fixed position in registry with the shaft, the bowl having an open top;
    a lid removably mountable over the open top of the bowl, the lid having a positioning tab extending from the outer periphery and an actuator tab extending radially from the positioning tab, the lid being rotatable for moving the actuator tab into engagement with the actuator to place the actuator in the activated position, the positioning tab in registry with the pedestal to provide a visual indication when the activator is in the activated position.

8. The food processor of claim 7, wherein the wherein the lid includes at least one generally upwardly extending arcuate rib.

9. The food processor of claim 7, wherein the bowl includes a handle diametrically opposed to the pedestal.

10. The food processor of claim 7, wherein the base includes a control for operating the motor, the control being diametrically opposed to the pedestal.

11. The food processor of claim 7, wherein the positioning tab includes an abutment member and the pedestal includes a surface in complementary facing relationship with the abutment member.

\* \* \* \* \*